(12) United States Patent
Ganesh et al.

(10) Patent No.: US 8,414,267 B2
(45) Date of Patent: Apr. 9, 2013

(54) MULTIPLE ALLOY TURBINE ROTOR SECTION, WELDED TURBINE ROTOR INCORPORATING THE SAME AND METHODS OF THEIR MANUFACTURE

(75) Inventors: Swami Ganesh, Clifton Park, NY (US); Robin Carl Schwant, Pattersonville, NY (US)

(73) Assignee: General Electric Company, Schenectady, NY (US)

( * ) Notice: Subject to any disclaimer, the term of this patent is extended or adjusted under 35 U.S.C. 154(b) by 522 days.

(21) Appl. No.: 12/570,566

(22) Filed: Sep. 30, 2009

(65) Prior Publication Data
US 2011/0076147 A1    Mar. 31, 2011

(51) Int. Cl.
*F01D 5/02*    (2006.01)
(52) U.S. Cl.
USPC .................. 416/213 R; 415/216.1; 29/889.2
(58) Field of Classification Search ............... 29/889.2, 29/889.21; 415/216.2, 199.5, 216.1; 416/213 R
See application file for complete search history.

(56) References Cited

U.S. PATENT DOCUMENTS

| | | | |
|---|---|---|---|
| 3,928,029 A * | 12/1975 | Fisk et al. | 420/485 |
| 4,863,682 A | 9/1989 | Coates et al. | |
| 4,962,586 A * | 10/1990 | Clark et al. | 29/889.2 |
| 5,161,950 A | 11/1992 | Krueger et al. | |
| 5,498,393 A | 3/1996 | Horimura et al. | |
| 6,152,697 A * | 11/2000 | Konishi et al. | 416/213 R |
| 6,454,531 B1 | 9/2002 | Crawmer | |
| 6,499,946 B1 * | 12/2002 | Yamada et al. | 415/199.4 |
| 6,767,649 B2 | 7/2004 | Staubli et al. | |
| 6,962,483 B2 | 11/2005 | Ganesh et al. | |
| 6,971,850 B2 | 12/2005 | Ganesh et al. | |
| 6,974,508 B1 * | 12/2005 | Gabb et al. | 148/428 |
| 7,065,872 B2 | 6/2006 | Ganesh et al. | |
| 7,179,342 B2 * | 2/2007 | Scarlin | 148/530 |
| 7,316,057 B2 * | 1/2008 | Seth | 29/458 |
| 2010/0059146 A1 * | 3/2010 | Sato et al. | 148/530 |

FOREIGN PATENT DOCUMENTS

| | | |
|---|---|---|
| DE | 19631582 A1 | 2/1998 |
| EP | 1622738 A1 | 2/2006 |

OTHER PUBLICATIONS

James J. Fisher et al., Enhanced Powder Metallurgy (P/M) Processing of Udimet Alloy 720 Turbine Disks—Modeling Studies, 2000, TMS (The Minerals, Metals & Materials Society), pp. 143-149.*
Introduction to PM HIP Technology, 2011, European Powder Metallurgy Association, Sections 4 and 4.1.*
M. Qian, J.C. Lippold, "Liquation Phenomena in the Simulated Heat-Affected Zone of Alloy 718 After Multiple Postweld Heat Treatment Cycles", Welding Journal, June 2003, pp. 145-150-S.
European Search Report for European patent application serial No. EP 10 18 0794 mailed Feb. 4, 2011.

* cited by examiner

*Primary Examiner* — Edward Look
*Assistant Examiner* — Liam McDowell
(74) *Attorney, Agent, or Firm* — Cantor Colburn LLP

(57) ABSTRACT

A method of making a multiple alloy, multi-section welded turbine rotor includes providing a forged multiple alloy rotor section having an integral microstructure, the rotor section comprising a first alloy having a first alloy composition and second alloy having a second alloy composition, a first weld face comprising the first alloy on a first end and an a second weld face comprising the second alloy on an opposed second end. The method also includes providing a first rotor section comprising the first alloy composition and a second rotor section comprising the second alloy composition. The method also includes welding the first rotor section to the first weld face and welding the second rotor section to the second weld face.

20 Claims, 11 Drawing Sheets

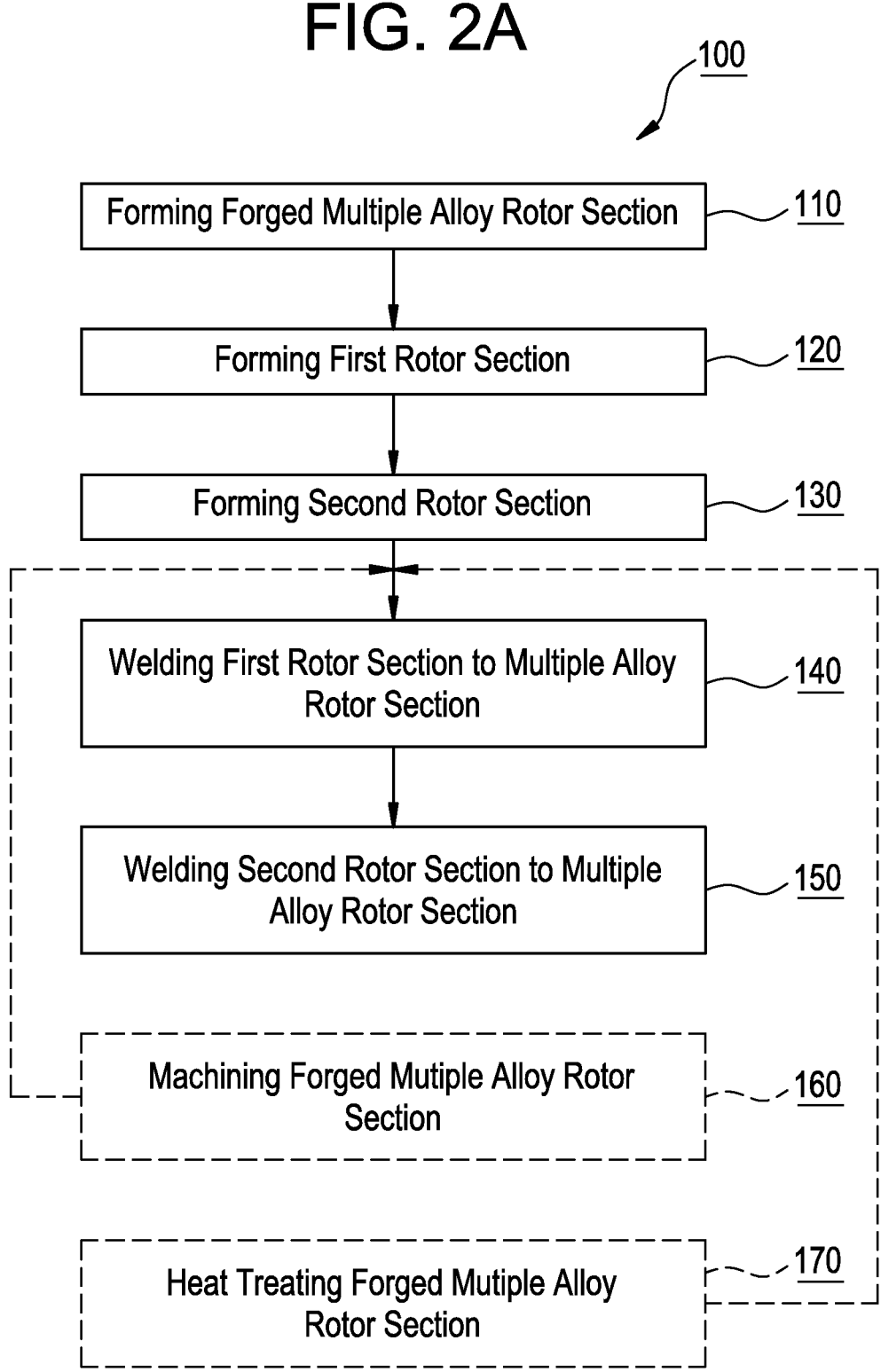

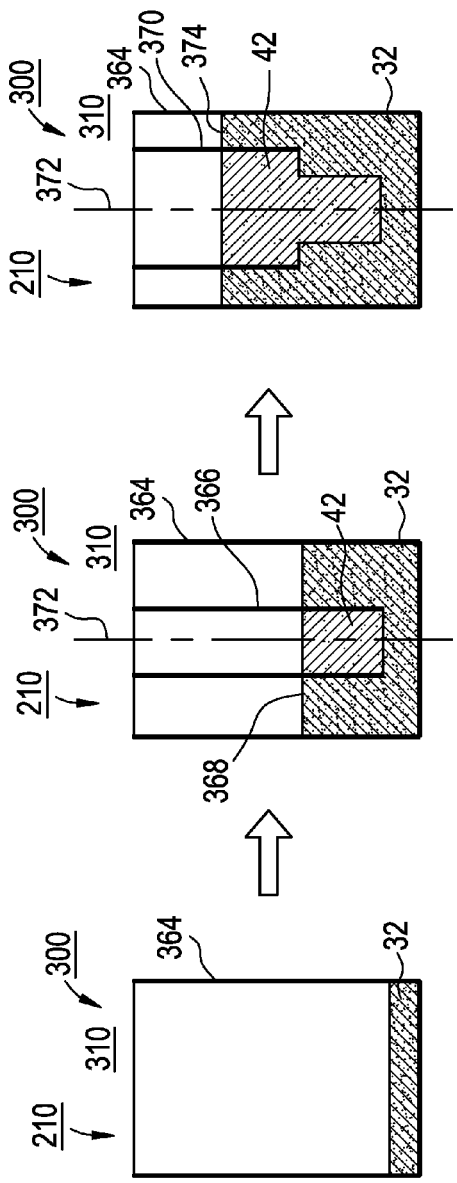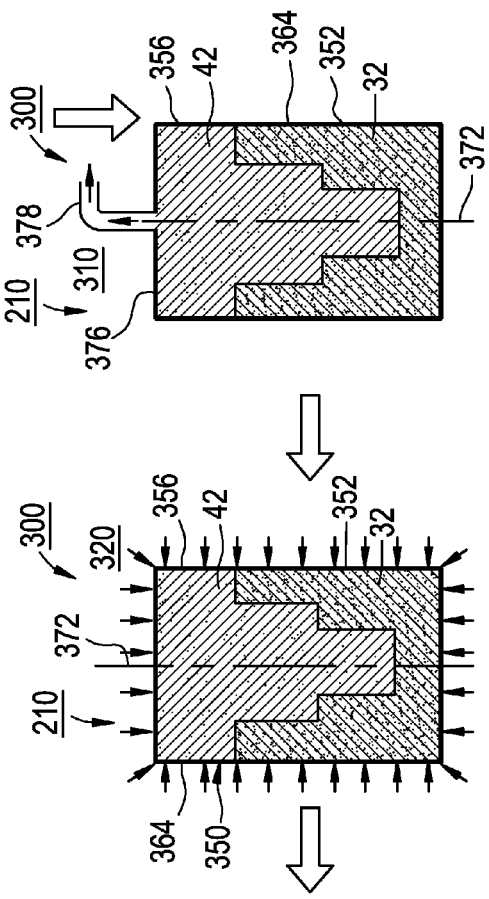

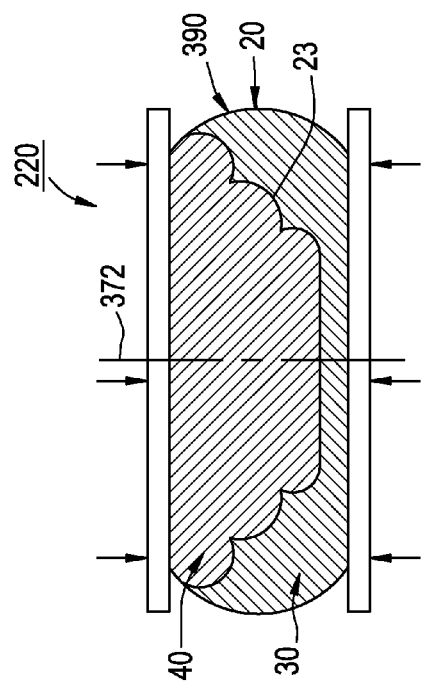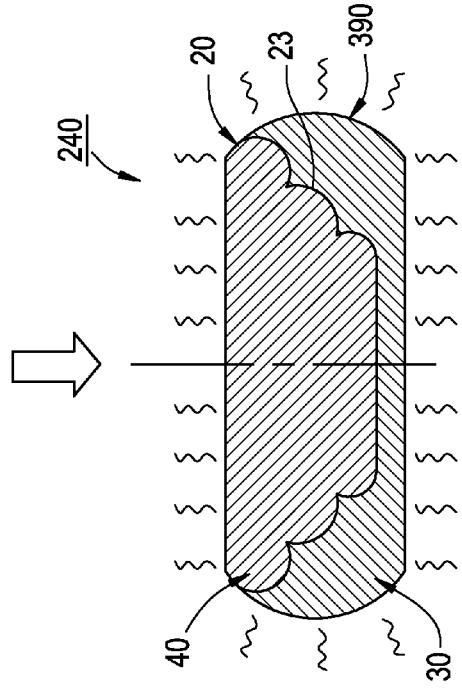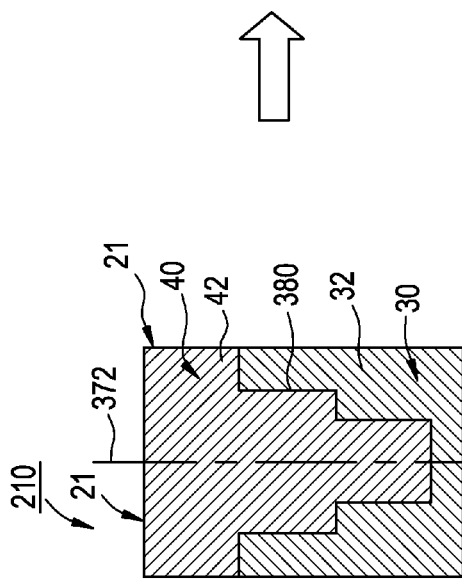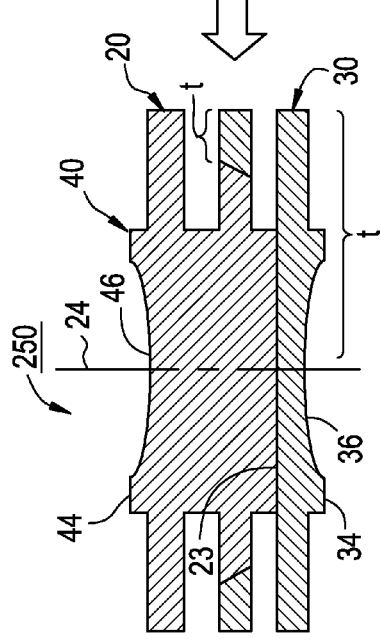

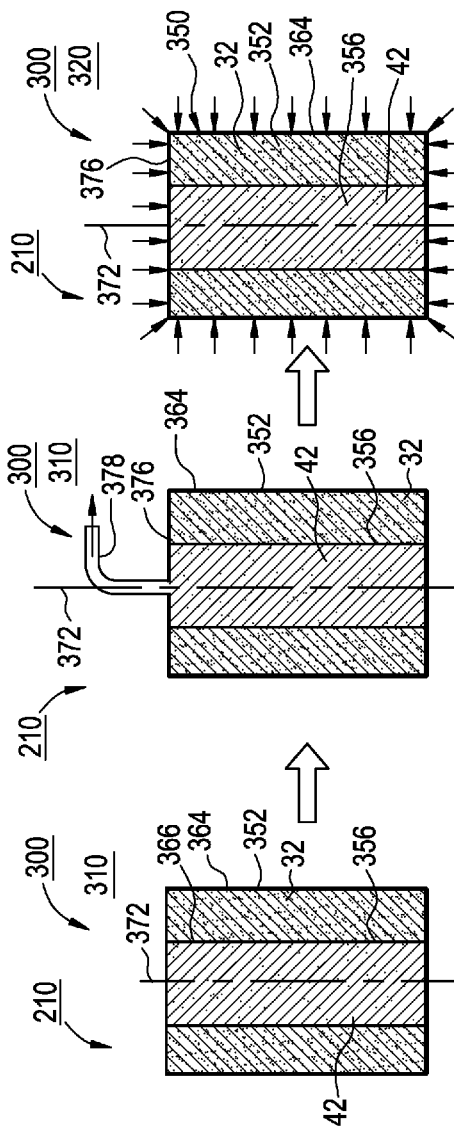

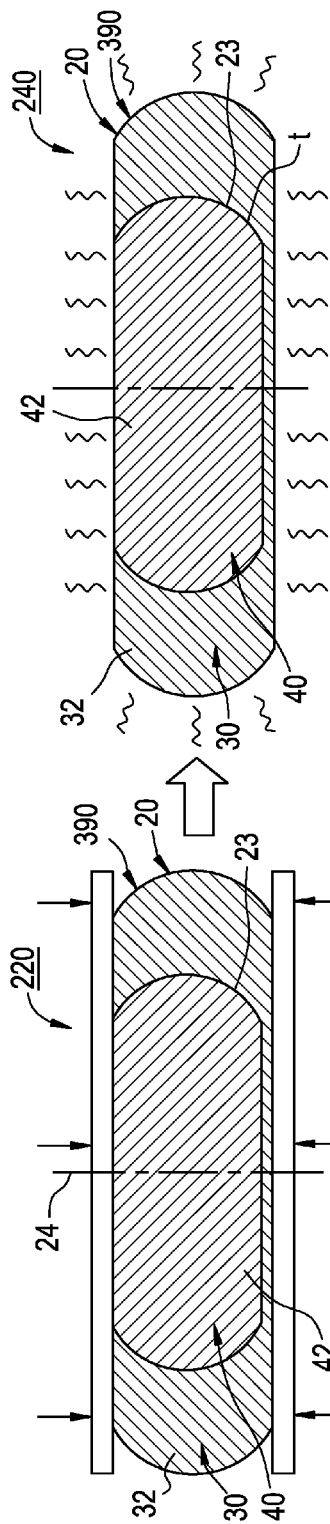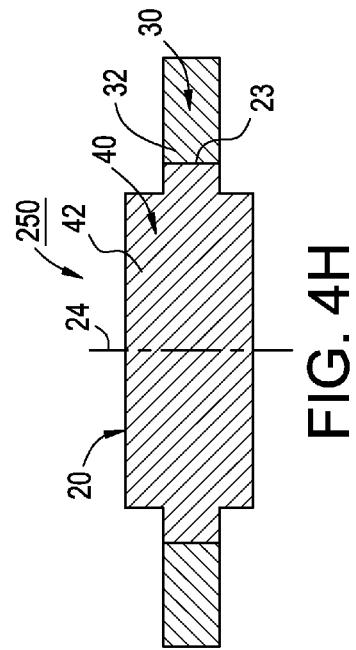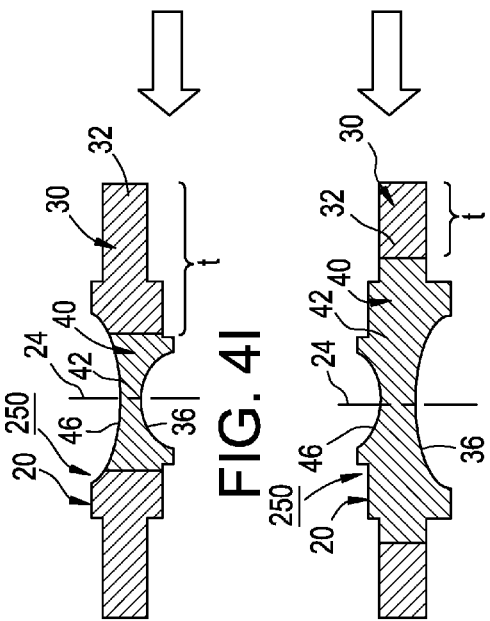

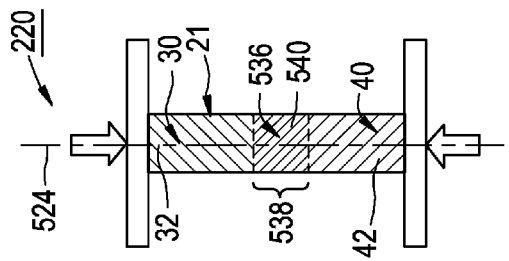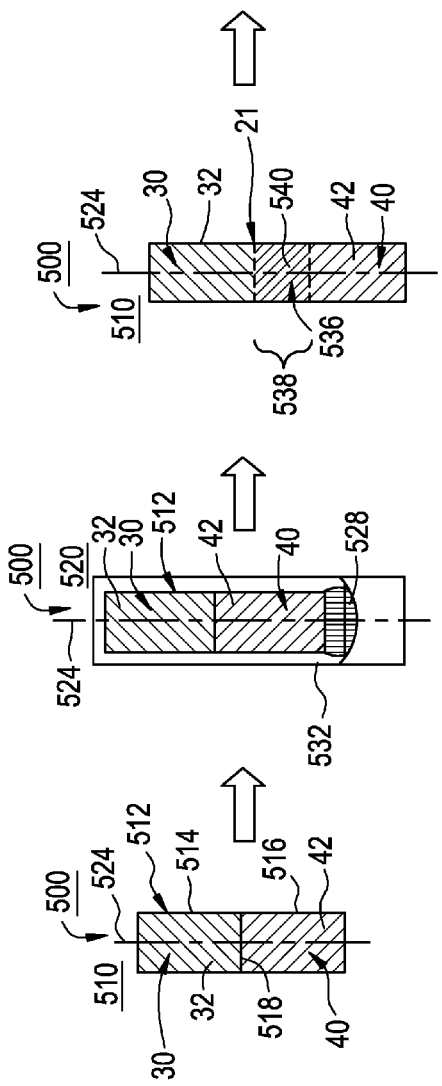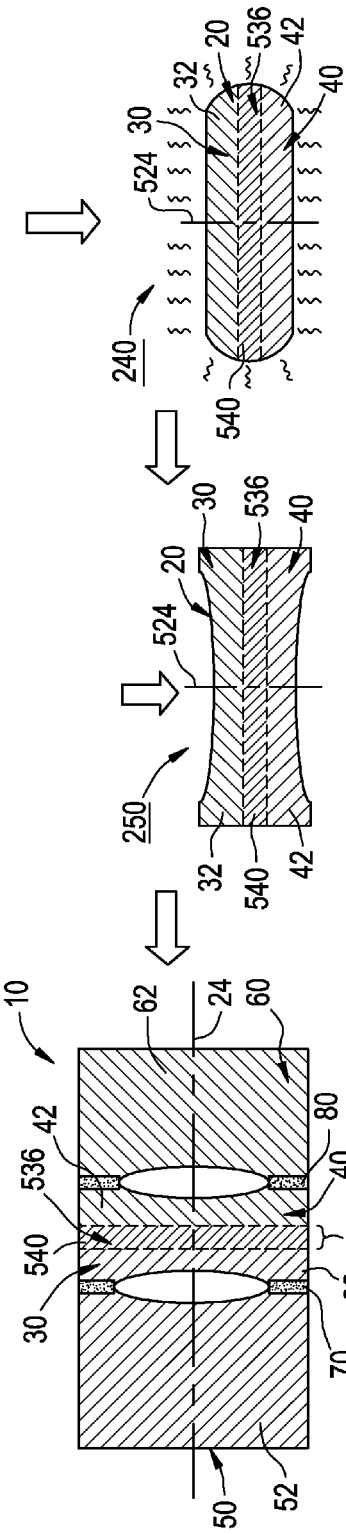

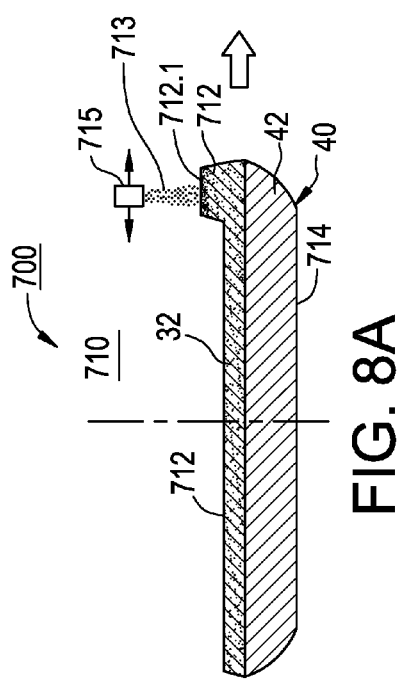
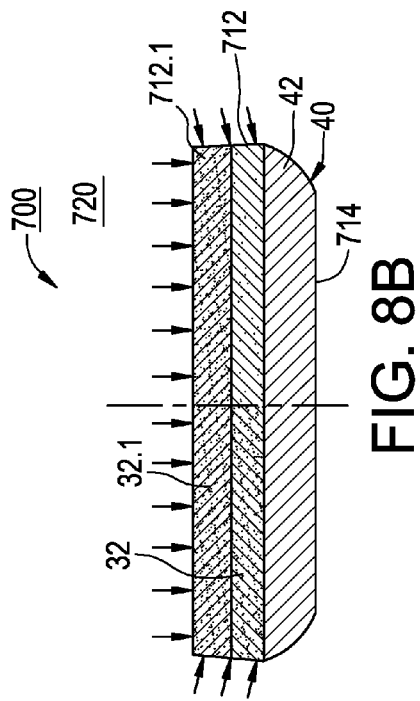
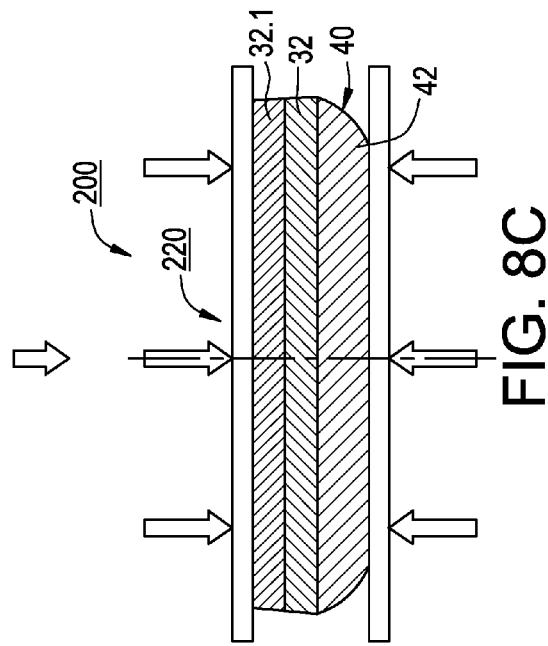
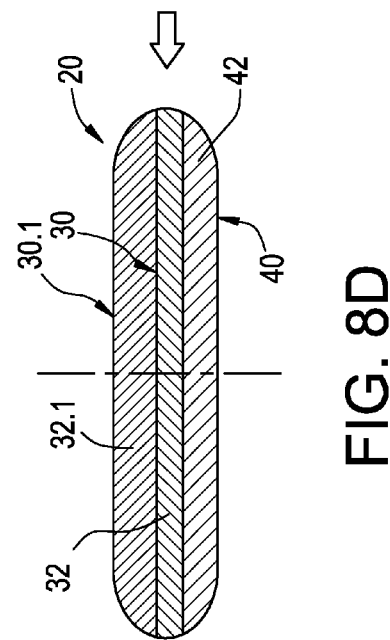

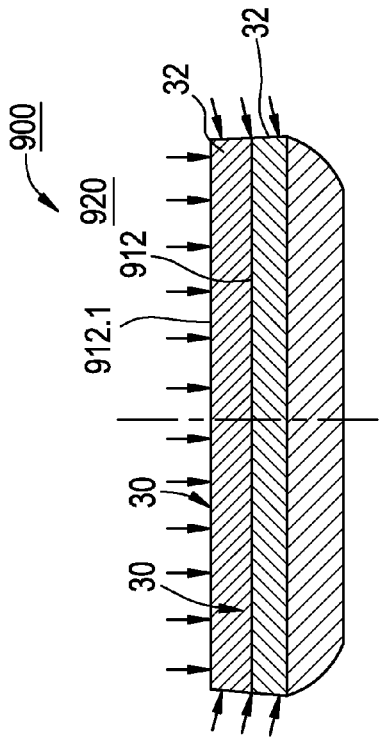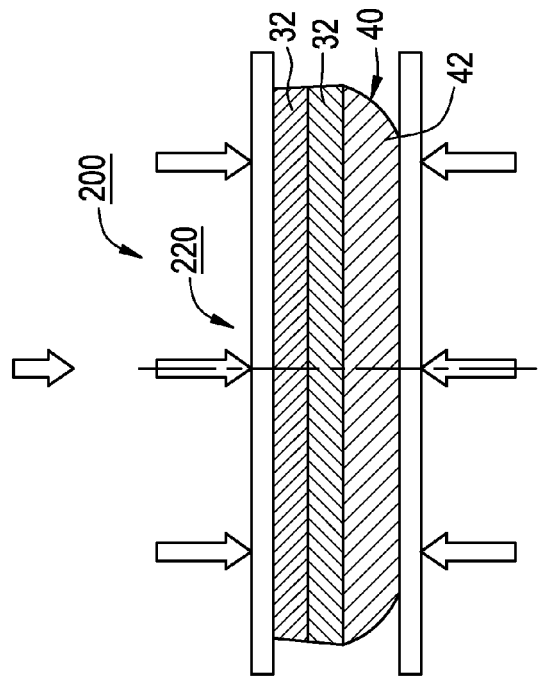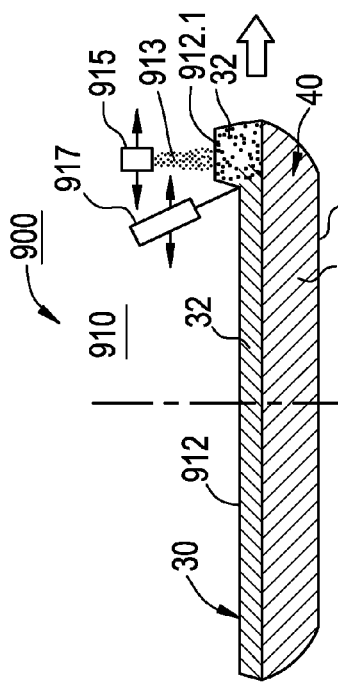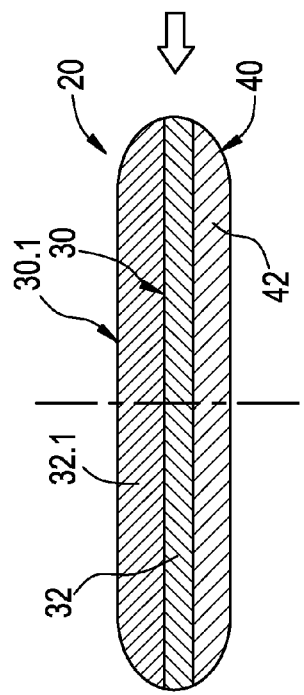

MULTIPLE ALLOY TURBINE ROTOR SECTION, WELDED TURBINE ROTOR INCORPORATING THE SAME AND METHODS OF THEIR MANUFACTURE

BACKGROUND OF THE INVENTION

The subject matter disclosed herein relates generally to multiple alloy turbine rotors, and more particularly to multiple alloy turbine rotors having a plurality of welded rotor sections.

The operating temperature of turbine rotors varies along the length of the rotor, with the first stage having the highest temperature, with the subsequent stages generally having progressively lower temperatures. The different operating conditions complicate the selection of a suitable rotor material and the manufacturing of the rotor because a monolithic rotor (i.e., a rotor that is not an assembly) of a single chemistry cannot meet the property requirements of each of the low pressure (LP), intermediate pressure (IP) and high pressure (HP) sections or stages of the turbine. For example, the inlet and exhaust areas of a turbine rotor, such as a turbine rotor for an industrial gas turbine, have different material property requirements. The high temperature inlet region typically requires a material with high creep rupture strength but only moderate toughness. The exhaust area, on the other hand, does not demand the same level of high temperature creep strength, but suitable materials typically must have very high toughness because of the higher loads imposed by longer turbine blades used in the exhaust area. In order to tailor the properties of the rotor and limit utilization of higher cost, high temperature, high strength alloys to only the portions of the rotor where they are needed, and to ensure high toughness and other properties where they are needed, various approaches have been utilized.

For the reasons discussed above, rotors constructed by assembling sections of different chemistries are widely used. Rotors for gas turbines and jet engines are often constructed by bolting a series of disks and shafts together. For example, large steam turbines typically have a bolted construction made up of separate rotors contained in separate shells or hoods for use in different sections of the turbine. Smaller steam turbines may make use of a mid-span coupling to bolt high and low temperature components together within one shell. While rotors having a bolted construction are widely used, they suffer from several disadvantages including increased numbers of parts, increased assembly requirements, increased length of the rotor assembly, and increased complexity associated with achieving the necessary balance of the rotor assembly.

One piece or monolithic multiple alloy turbine rotors have been developed to provide high temperature, high strength alloys where they are needed, such as in the HP and IP sections of the rotors, and to utilize lower cost, lower strength, high toughness alloys in the cooler portions of the rotors, such as the LP section. While monolithic multiple alloy rotors are known, the materials and processes needed to manufacture them as large rotor forgings are complex and costly. Further, replacement of a particular rotor section is generally not possible, which also is undesirable from the standpoint of ease and cost of maintenance of the turbine over its operating lifetime.

Multi-section, multiple alloy rotors made by welding dissimilar metal alloys have also been proposed; however, their use has been limited due to one or more of the following concerns typically associated with dissimilar alloy weld joints. One concern is high weld cracking susceptibility due to intermixing of widely different chemistries in the weld pool that result in solidification over a wide temperature range, which can in turn correspond to a wide range of melting points within the weld. Another concern is heat-affected zone cracking from mechanisms such as intergranular liquidation caused by low melting temperature phases, such as eutectic phases, or strain age cracking. Still another concern is poor weld joint mechanical properties, such as tensile strength, ductility, high cycle and low cycle fatigue, creep rupture, fracture toughness and the like, due to the formation of complex phases from the intermixing of alloys having widely different chemistries. Still another concern is high transient thermal strains due to thermal expansion mismatch across the weld joint. Another concern is the potential for long-term microstructural instability in high temperature operation due to complex metastable phases in the weld joint and diffusion effects that can result in the formation of brittle phases in the weld joint, such as various intermetallic phases. Yet another concern is the segregation of carbon, boron, and other elements across the weld diffusion zone either during post weld heat treatment or during long term service. Such segregation is caused by variation in the chemistry between the weld and the parent metal. Such effect can cause degradation of critical properties and cracking susceptibility.

Past approaches for welding of dissimilar alloys to form turbine rotors have involved the buildup of fusion welded clad layers of various chemistries on the joint face of one or both rotor sections. The clad layers have included those having uniform or varying alloy chemistries. The cladding is heat treated and machined prior to welding the preforms. This approach is costly, time consuming and also may not alleviate some of the concerns described above related to the welding of dissimilar metals.

While various multiple alloy welded turbine rotor configurations and methods for their manufacture are known, all known constructions involve welding of dissimilar metals and are subject, in varying degrees, to the concerns related thereto described above.

Therefore, welded multiple alloy rotor configurations and methods of their manufacture that reduce or eliminate concerns associated with the welding of dissimilar metals are desirable.

BRIEF DESCRIPTION OF THE INVENTION

According to one aspect of the invention, a method of making a multiple alloy, multi-section welded turbine rotor is provided. The method includes providing a forged multiple alloy rotor section having a monolithic structure, comprising a first alloy having a first alloy composition and second alloy having a second alloy composition, a first weld face including the first alloy on a first end and a second weld face including the second alloy on an opposed second end. The method also includes providing a first rotor section including the first alloy composition and a second rotor section including the second alloy composition. The method also includes welding the first rotor section to the first weld face and welding the second rotor section to the second weld face.

According to another aspect of the invention, a multiple alloy, multi-section welded turbine rotor is provided. The rotor includes a multiple alloy rotor section having a monolithic structure, including a first alloy having a first alloy composition and second alloy having a second alloy composition, a first weld face comprising the first alloy on a first end and a second weld face including the second alloy on an opposed second end, the monolithic structure having a forged grain morphology. The rotor also includes a first rotor section comprising the first alloy composition, the first rotor section joined to the first weld face by a first weld joint. The rotor also includes a second rotor section comprising the second alloy composition, the second rotor section joined to the second weld face by a second weld joint.

According to yet another aspect of the invention, a multiple alloy rotor section is provided. The multiple alloy rotor section has a monolithic microstructure, including a first alloy portion having a first alloy composition and second alloy portion having a second alloy composition, a first weld face comprising the first alloy on a first end and a second weld face comprising the second alloy portion on an opposed second end, the monolithic microstructure having a forged grain morphology.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 3A-3I are schematic illustrations of an exemplary embodiment of a method of making a multiple alloy forging preform and forging the same to form a multiple alloy rotor section as disclosed herein;

FIGS. 4A-4J are schematic illustrations of a second exemplary embodiment of a method of making a multiple alloy forging preform and forging the same to form a multiple alloy rotor section as disclosed herein;

FIGS. 6A-6F are schematic illustrations of a third exemplary embodiment of a method of making a multiple alloy forging preform and forging the same to form a multiple alloy rotor section as disclosed herein;

FIG. 7 is a schematic illustration of a third exemplary embodiment of a method of making a multiple alloy, multi-section welded turbine rotor and welded rotor made thereby as disclosed herein;

FIGS. 8A-8D are schematic illustrations of a fourth exemplary embodiment of a method of making a multiple alloy forging preform and forging the same to form a multiple alloy rotor section as disclosed herein; and FIGS. 9A-9D are schematic illustrations of a fifth exemplary embodiment of a method of making a multiple alloy forging preform and forging the same to form a multiple alloy rotor section as disclosed herein.

Figures 1A, 1B:
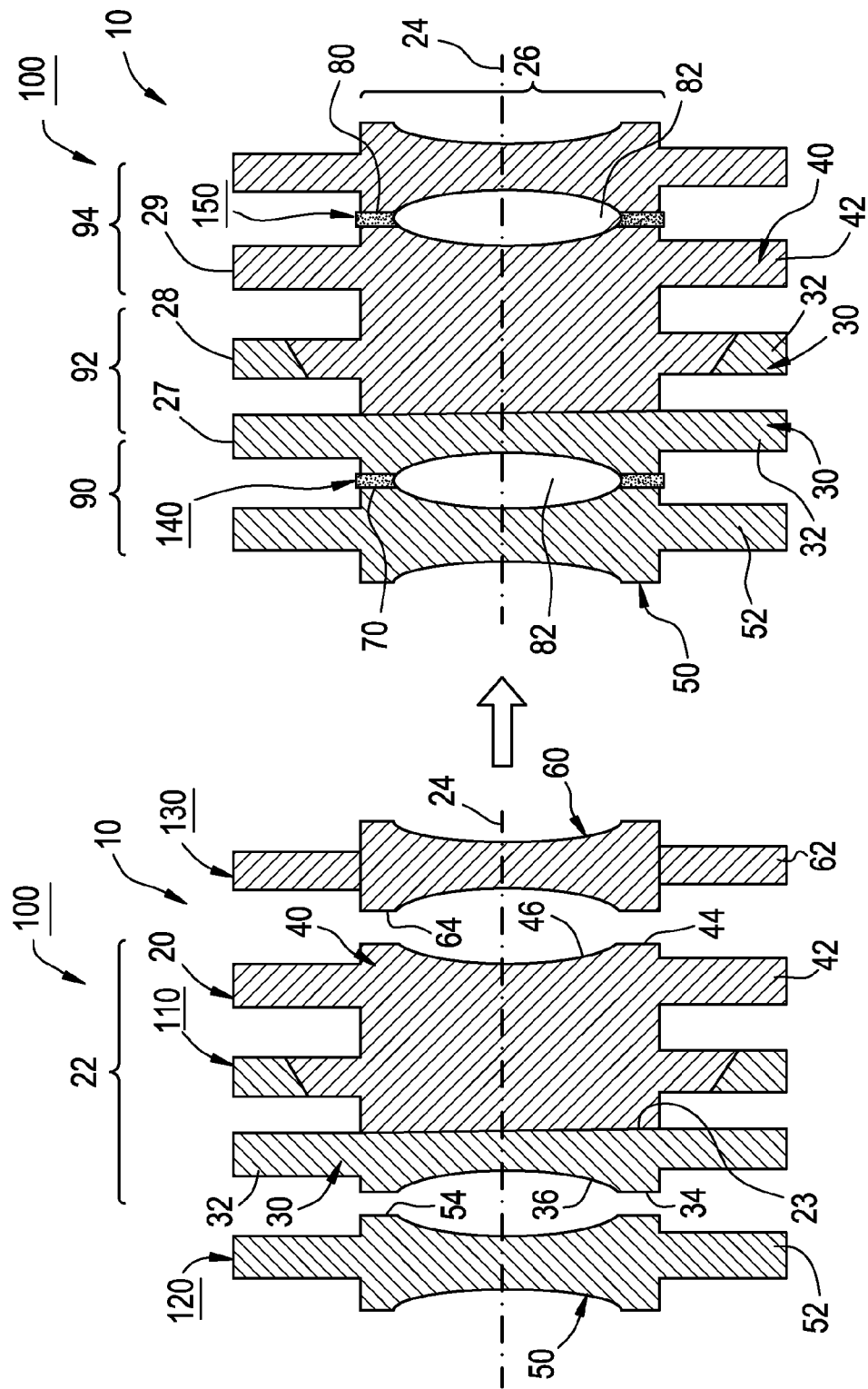
FIGS. 1A and 1B are schematic illustrations of a method of making a multiple alloy, multi-section welded turbine rotor and welded rotor made thereby as disclosed herein.

In the nomenclature employed in the drawings, generally, underlined elements have been employed with reference to a method. The detailed description explains embodiments of the invention, together with advantages and features, by way of example with reference to the drawings.

DETAILED DESCRIPTION OF THE INVENTION

Exemplary multi-section, multiple alloy, welded turbine rotor configurations and methods of making these rotors utilizing exemplary forged, multiple alloy rotor sections are disclosed, as well as exemplary methods of making such rotor sections. Referring to FIGS. 1A, 1B and 2A, a method 100 of making a multiple alloy, multi-section welded turbine rotor 10 is disclosed. The method 100 includes forming 110 a forged multiple alloy rotor section 20 having a monolithic structure 22. The multiple alloy rotor section 20 includes a first alloy 30 portion having a first alloy composition 32 and second alloy 40 portion having a second alloy composition 42. First alloy portion 30 and second alloy portion 40 comprise an integral structure with the portions defined by interface 23. First alloy 30 includes a first weld face 34 on a first end 36 of multiple alloy rotor section 20. Second alloy 40 includes a second weld face 44 on second end 46 that opposes first end 36. The first alloy composition 32 is different than the second alloy composition 42. First alloy 30 and second alloy 40 may include any suitable alloys, including those described herein.

Method 100 also includes forming 120 a first rotor section 50 that has a first rotor section alloy composition 52 and a weld face 54 configured for disposition proximate first weld face 34. First rotor section alloy composition 52 is substantially the same as first alloy composition 32 proximate weld face 54. In the exemplary embodiment illustrated in FIGS. 1A and 1B, first rotor section alloy composition 52 is the same as first alloy composition 32 proximate weld face 54, and in this embodiment composition 52 is substantially the same throughout the first rotor section 50.

Method 100 also includes providing 130 a second rotor section 60 that has a second rotor section alloy composition 62 and a weld face 64 configured for disposition proximate second weld face 44. Second rotor section alloy composition 62 is substantially the same as second alloy composition 42 proximate weld face 64. In the exemplary embodiment illustrated in FIGS. 1A and 1B, second rotor section alloy composition 62 is the same as second alloy composition 42 proximate weld face 64, and in this embodiment composition 62 is substantially the same throughout the second rotor section 60.

Method 100 also includes welding 140 the first rotor section 50 to multiple alloy rotor section 20 by forming a weld joint 70 between the first weld face 34 and weld face 54. Welding 140 may include any suitable welding process or method for joining similar metal and alloys, and particularly those suitable for joining various superalloys, including Ni-base, Fe-base and Co-base superalloys, or combinations thereof, and those suitable for joining various grade of steel, including various grades of stainless steel.

Method 100 also includes welding 150 the second rotor section 60 to multiple alloy rotor section 20 by forming a weld joint 80 between the second weld face 44 and weld face 64. Welding 150 may also include any suitable welding process or method for joining similar metal and alloys, and particularly those suitable for joining various superalloys, including Ni-base, Fe-base and Co-base superalloys, or combinations thereof, and those suitable for joining various grade of steel, including various grades of stainless steel. The steps of welding 140 and welding 150 may utilize the same welding method or different welding methods. In an exemplary embodiment, welding 140 and welding 150 both include fusion welding, including tungsten inert gas (TIG), submerged arc (SA) electron beam (EB), laser welding or other fusion welding methods that involve localized reflow of the materials being welded proximate the interface between them.

In an exemplary embodiment, the method 100 may also include machining 160 the forged multiple alloy rotor section 20 prior to welding 140 the first rotor section or welding 150 the second rotor section. Machining 160 may be used to remove material from the central portion of the section 20 at first end 36 and second end 46, such as the inwardly concave faces illustrated. Removal of material at these locations also may be used in conjunction with the formation and definition of first weld face 34 and second weld face 44. Removal of material in these locations also provides a desirable void 82 in the interior of the hub and enables welding 150, wherein the entirety of weld faces 34 and 44 may be accessed sufficiently during welding to form a weld joint across them, and eliminates the need to form the weld across the entire diameter of the rotor sections. Machining 160 may include any suitable form of metal working, including processes employed to prepare the weld faces for welding, including CNC machining, grinding and the like.

Method 100 may also include heat treating 170 the forged multiple alloy rotors section 20 prior to welding 140 the first rotor section or welding 150 the second rotor section. Heat treating may include any suitable heat treatment desirable to develop the properties of first alloy 30 or second alloy 40, or both of them. This may include full solution (super-solvus) heat treatment, partial solution (sub-solvus) heat treatment (i.e. that does not fully recrystallize one or the other of the alloy microstructures), aging heat treatment, phase transformation heat treatment and the like. Any heat treatment 170 provided must take into consideration the impact on the properties of both first alloy 30 and second alloy 40. Heat treatment 170 may also include various forms of differential heat treatment, wherein first alloy 30 and second alloy 40 are subjected to different heating and cooling schedules, including different maximum temperatures, different hold temperatures, heating and cooling rates and the like.

The turbine rotor 10 configurations described herein use specially designed forged multiple alloy rotor sections 20, wherein the alloy chemistry and metallurgical characteristics at one end of the forging includes one alloy composition (e.g. CrMoV low alloy steel) while the other end of the forging includes a second alloy composition (e.g. a nickel-base superalloy) that is different from the first alloy composition. Such forged multiple alloy rotor sections 20 can be effectively joined by welding at each end with monolithic alloy rotor sections having the same alloy compositions yielding superior, low risk, similar alloy composition welds produced in accordance with established welding practices.

Turbine rotor 10 produced by method 100 can be heat treated using monolithic or differential heat treatment, where the heat treatment conditions (e.g., temperature, time, heating rate, cooling rate, atmosphere) of one or more of multiple alloy section 20, or monolithic rotor sections 50, 60 is different than that of the other sections, or within a section (e.g., multiple alloy section 20) in order to achieve a desired microstructure and properties within rotor 10, such as to enhance mechanical strength, toughness and the like.

An important aspect is the use of specially designed forged multiple alloy sections 20 as spacers bridging the gap between high temperature stages using materials having high temperature strength, creep, and crack resistance and the relatively low temperature stages using materials that have higher strength and toughness, but lower creep resistance. Such spacer forgings employ enable similar alloy weld joints that do not present the problems described herein that occur in welded rotors that have dissimilar metal weld joints, and that have the following advantages. First, similar alloy chemistries can be welded together using established welding practices without the risk of weld and heat affected zone (HAZ) cracking, because the solidification range of similar alloy weld pools are much narrower than those of dissimilar alloy weld pools. Secondly, there is a relatively lower thermal expansion mismatch within similar alloy weld joints, which lower the thermal strains across the joint and, thereby, lower the risk of weld and HAZ cracking. Thirdly, there is a lower risk of complex, undesirable, metallurgical phases in similar alloy welds, and thus greater long-term microstructural stability. The forged multiple alloy rotor sections 20 act in their own right as working sections of the rotor, but also act as spacers or transition pieces that enable the use of similar alloy weld joints along the lengths of the rotors, and likewise avoid certain limitations and concerns associated with the use of dissimilar alloy weld joints, including poor weldability and weld properties as described herein. Fourthly, this rotor section configuration provides lower cost and improved producibility by using high cost, high temperature, alloys only where needed with smaller rotor section forgings rather than using a large monolithic rotor forgings that are known to be very expensive and difficult to produce in large sizes. Another unique aspect of the rotors 10 described herein is the ability to tailor the bore and rim alloy proportions and compositions, as well as the axial alloy differences, to develop the creep strength requirements of the various stages.

These rotors 10 may be constructed using forged multiple alloy sections 20 of appropriate size and alloy composition or chemistry to provide desired mechanical properties, weld quality, producibility (smaller sections are generally more producible than monolithic rotors), corrosion resistance, overall material cost (use of high cost alloys in a section 20 or sections 20 only where needed rather than for an entire rotor 10), and desired weld joints (use of similar alloy welds rather than dissimilar alloy welds). The chemistry and microstructure of the forging sections may be selected to meet the temperature capability and property requirements of the rotor stages. A multiple alloy forged rotor section 20 may be produced using any of the approaches described herein, with varying proportions of the adjacent monolithic section chemistries. The weld joints in the end faces of the forged multiple alloy section 20 may be made using similar alloy welds with adjacent monolithic alloy rotor sections of substantially similar or the same alloy compositions as the alloy of the rotor section 20.

Referring to FIGS. 1A to 9D, forged multiple alloy rotor sections 20 can be produced by any suitable forming method, which is referred to generally herein as forging, but may include forging as well as other methods of plastically deforming a multiple alloy forging preform, such as hot-rolling. For example, referring generally to FIGS. 1A-1B and 3A-3I, this may include forging 220 of specially designed multiple alloy rotor sections formed from powder metal compacts or preforms containing varying proportions of at least two different alloy compositions that are at least axially separated along a longitudinal axis of the compact, as described further herein. The compact can then be consolidated in a hot isostatic press (HIP) or by any suitable powder compact consolidation method to form a multiple alloy forging preform followed by forging to the desired form, or alternately, by extruding and consolidating to form a forging preform followed by forging to the desired form (FIGS. 3A-3I). Referring generally to FIGS. 4A-5B, forging of multiple alloy rotor sections 20 may also include forging of specially designed multiple alloy powder metal compacts containing varying proportions of at least two different alloys that are radially separated (e.g., in the bore and rim region). The compact can then be consolidated in a HIP or by any suitable powder compact consolidation method to form a forging preform 340 and forged to the desired form, or extruded to form a forging preform, followed by forging of forging preform to form the forged multiple alloy rotor section 20. Referring generally to FIGS. 6A-7, forging of section 20 may also include forging of preforms that include multiple alloy ESR or VAR ingots made by ESR or VAR melting of multiple alloy electrodes having a predetermined compositional or chemistry gradient. The electrodes may include consolidated powder compacts formed by HIP or other suitable powder compact consolidation methods or by friction welding or inertia welding preforms, such as rods, of the desired alloy compositions to form the multiple alloy forging preform, followed by forging of such preform to produce the forged multiple alloy rotor section 20. Referring generally to FIGS. 8A-8D, forging of sections 20 may also include a method 700 of forging preforms made by spray forming a first alloy composition over a preform of a second alloy composition, or alternately, by spray forming a preform of first alloy composition followed by spray forming a second alloy composition over the preform to produce a multiple alloy forging preform, followed by HIP to consolidate the spray formed preform, and forging (or rolling) of such preform to form the forged multiple alloy rotor section 20. Referring generally to FIGS. 9A-9D, forging of section 20 may also include forging 900 of forging preforms made by applying a powder of a first alloy composition to a preform of a second alloy composition, such as by applying a layer of one alloy composition (e.g., by laser bonding particles) on a weld joint face of a preform of a second alloy composition, followed HIP to consolidate the powder layer and form the multiple alloy forging preform, followed by forging of forging preform to form the forged multiple alloy rotor section 20. These methods of forming multiple alloy forging preforms for use in methods of forming forged multiple alloy rotor sections as described further below.

Referring again to FIGS. 1A and 1B, multiple alloy, multi-section welded turbine rotor 10 has a forged multiple alloy rotor section 20 having a monolithic microstructure 22 and a longitudinal axis 24. As used herein, monolithic microstructure refers to the fact that multiple alloy rotor section 20 has an integral microstructure at the interface 23 between them characterized by limited intermixing of the constituents of the respective alloys or alternately the transition zone between the two alloys can be tailored to provide a controlled gradient in chemistry and microstructure to avoid localized strain concentrations. Interface 23 does not include a weld joint having a microstructure characterized by melting and resolidification of one or both of first alloy 30 and second alloy 40, and as further characterized by morphological features in the microstructure that are unique to melting/resolidification, such as unique phases associated with these processes, particularly low melting temperature phases, as described above. As shown in FIGS. 1A and 1B, the forged multiple alloy rotor section 20 may be configured to include a cylindrical hub 26 and a plurality of axially spaced and axially separated cylindrical disks 27, 28, 29 that protrude outwardly from hub 26. As shown in FIGS. 1A and 1B, the first alloy 30 portion and second alloy 40 portion may be axially separated along forged, multiple alloy rotor section 20. As also shown in FIGS. 1A and 1B, the first alloy 30 portion and second alloy 40 portion may also be radially separated about longitudinal axis 24. These aspects of forged, multiple alloy rotor section 20 provide advantageous design flexibility, including the ability to axially space alloys having different alloy properties where they are needed with regard to the design and performance requirements imposed upon turbine rotor 10. For example, in an HP section 90 of the rotor 10, the alloy selected for first alloy 30 or second alloy 40 used in this section may require high strength at high operating temperatures, resistance to high temperature oxidation, high temperature holdtime fatigue crack resistance, high temperature erosion and corrosion resistance and the like. Likewise, in the IP section 92, where operating temperatures are generally somewhat lower, it may be desirable to retain some or all of the high temperature characteristics described above with regard to the HP section in the portion of IP section 92, or in the outermost portions of turbine disks located in this section, such as the outermost portion of protruding disk 28. It may also be desirable to provide higher toughness in the core portion or hub 26 of rotor 10 due to increased dynamic loading in this section. Further, in the LP section 94, the requirements for the high temperature properties described above may be substantially reduced due to the significantly lower operating temperature in this section of rotor 10, such that it may be desirable to have enhanced toughness in this section relative to HP section 90 and IP section 92, due to even greater dynamic loads in this section of rotor 10 associated with still larger and heavier turbine blades attached in this section of rotor 10.

Forged multiple alloy rotor section 20 has a forged microstructure. The forged microstructure includes deformation characteristic of forging.

First alloy 30 and second alloy 40 are different alloy compositions having either different alloy constituents, relative amounts of the constituents, different phases or different microstructural morphologies, or a combination of the above. For example, one of the first alloy 30 or second alloy 40 may include a Ni-base or Fe-base superalloy, or a combination thereof, and the other of first alloy 30 or second alloy 40 may include a steel, such as a stainless steel.

Notable commercial alloys that are suitable as one of first alloy 30 or second alloy 40 for use as the LP section 94 alloy include NiCrMoV-type low alloy steels with varying amounts of nickel, chromium, molybdenum, vanadium, chemistry or other constituents and generally identified in Table 1. Alloys that are suitable for use as the IP section 92 or HP section 90 include a variety of alloys having increasing high temperature properties of the types described herein, such as the conventional CrMoV low alloy steels; 9-14 Cr-type stainless steel alloys with varying levels of Mo, V, W, Nb, B and N; Fe—Ni alloys, or Ni-base, superalloys. Alloys suitable for the LP section 94 include the following:

TABLE 1

| ALLOY TYPE | COMPOSITION (approximate by wt. %) |
| --- | --- |
| NiCrMoV low alloy steel | 1.5-4.5 Ni, 0.5-2.3 Cr, 0.15-.75 Mo, 0.05-.25 V, 0.18-0.36 C, balance Fe and incidental impurities. |

Alloys suitable for the HP and intermediate sections 90 and 92, respectively, include the following:

TABLE 2

| ALL TYPE | COMPOSITION (approximate by wt. %) |
| --- | --- |
| CrMoV Low Alloy Steel | 0.15-0.35C, 0.5-1.0 Mn, 0.25-0.75 Ni, 0.75-2.5 Cr, 0.75-2.5 Mo, 0.2-0.4 V, balance Fe and incidental impurities. |
| Martensitic Stainless Steel | 0.05-0.25 C, 9-14 Cr, 0-2 Mo, 0-0.3 V, 0.015-0.065 N, 0-6 Co, 0-3 W, 0-1.3 Ni, 0-1 Mn, balance Fe and incidental impurities. |
| Fe—Ni Alloy | 24-27 Ni, 13-16 Cr, 1.8-2.5 Ti, 1-1.5 Mo, 0.1-0.5 V, less than 2 Mn, less than 1 Si, less than 0.5 Al, less than 0.08 C, balance Fe and incidental impurities. |
| Nickel-Base Alloy | Covers a range of Ni base alloys such as alloys 718, 706, 725, 625, 617, Waspalloy, Haynes 282 and many such alloys in commercial use. Typical range of compositions |

TABLE 2-continued

| ALL TYPE | COMPOSITION (approximate by wt. %) |
|---|---|
| | include: 16-20 Fe, 17-21 Cr, 2.5-3.5 Mo, 4.5-5.5 Nb, 0.6-1.2 Ti, 0.2-0.8 Al, 0-1 Co, less than 0.35 Mn, less than 0.35 Si, less than 0.08 C, balance Ni and incidental impurities |

Figure 2B:
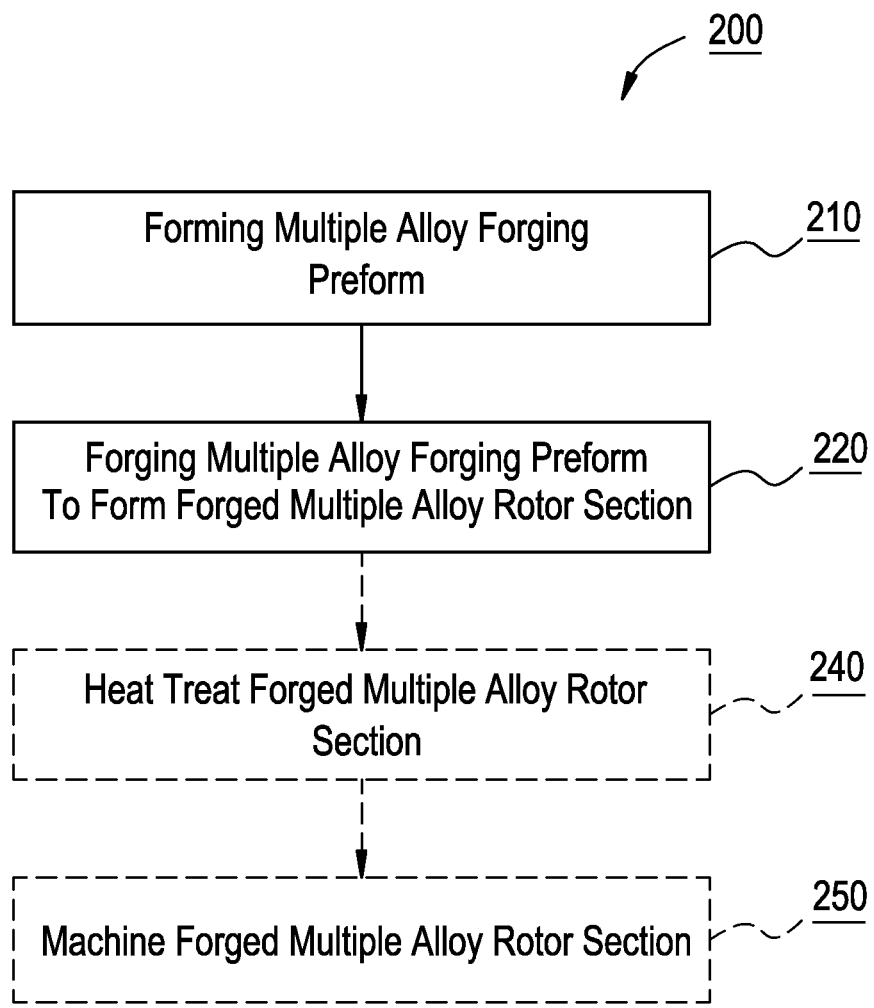
FIG. 2B is a flowchart illustrating a method of making a forged, multiple alloy rotor section as disclosed herein.
Figure 2A:
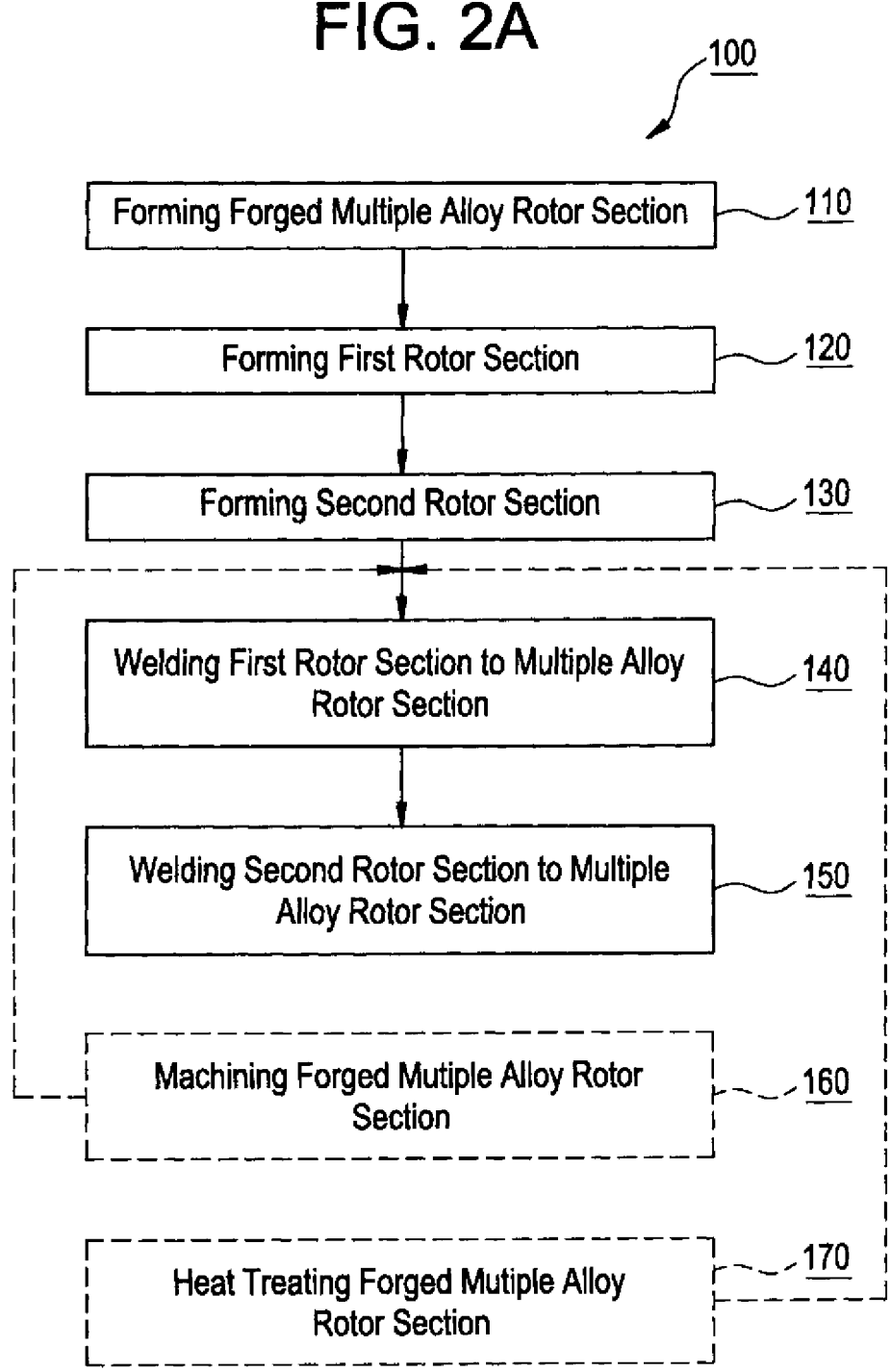
FIG. 2A is a flowchart illustrating a method of making a forged, multiple alloy rotor using a forged, multiple alloy rotor section as disclosed herein.

Referring to FIG. 2B, forged multiple alloy rotor section 20 may be provided by a method 200, including: forming 210 a multiple alloy forging preform 21, and forging 220 the multiple alloy forging preform 21 to form the forged multiple alloy rotor section 20. The steps of forming 210 and forging 220 may be understood with reference to several exemplary embodiments set forth in FIGS. 3A-9D, and described further below.

Referring to FIGS. 3A-3I, in an exemplary embodiment, forming 210 the multiple alloy forging preform 21 (FIG. 3F) may employ a method 300 that includes forming 310 a multiple alloy powder preform 350 (FIG. 3E). Multiple alloy powder preform 350 includes a first portion 352 comprising a first metal powder having the first alloy composition 32 and a second portion 356 comprising a second metal powder having the second alloy composition 42. Method 300 also includes consolidating 320 the powder preform 350 to sinter and densify the powder of the first alloy composition 354 and form the first alloy 30 and the powder of the second alloy composition 358 to form the second alloy 40 (FIG. 3F), the first alloy 30 and second alloy 40 make up the multiple alloy forging preform 21.

Referring to FIG. 3A, a layer of first metal powder having a first alloy composition 32 is placed in a suitable container 364, such as a metal can. The layer may have any suitable thickness. Referring to FIG. 3B, a first tube 366 is inserted in the container 364 to provide separation and placement of the powder of the second alloy composition 42 within the first tube 366 and the powder of the first alloy composition 32 outside the tube 366, as well as a predetermined size and location of these powder portions. The container 364 is filled with both alloy powders to a first predetermined level 368. Once the first predetermined level 368 is reached, first tube 366 is withdrawn. Referring to FIG. 3C, a second tube 370 is placed within container 364. In the embodiment shown, second tube 370 has a diameter that is larger than first tube 366; however, other embodiments where the relative diametral sizes are reversed is also possible. Both first tube 366 and second tube 370 may be centered on longitudinal axis 372 of container 364 so that powders are axisymmetrically located within container 364. The container 364 is again filled with both alloy powders to a second predetermined level 374. Once the second predetermined level 374 is reached, second tube 370 is withdrawn. This process may be repeated with any number of tubes of varying diameter to form the desired number of steps at the interface of the two powders. Referring to FIG. 3D, once second tube 370 is withdrawn, container 364 is again filled with the powder of second alloy composition 42. Once container 364 is filled, a cover 376 is sealingly attached to container 364 and container 364 is evacuated, such as through a sealing tube 378, and then sealed as shown in FIG. 3E thereby forming 310 a multiple alloy powder preform 350. Referring to FIG. 3E, the evacuated container 364 and multiple alloy powder preform 350 are consolidated 320, to sinter and densify multiple alloy powder preform 350 to full or theoretical density by suitable application of heat and pressure over time, such as by pressing in a hot isostatic press (HIP). The container 364 can then be removed by any suitable method including chemical or mechanical methods, such as machining, thereby forming 210 (FIG. 2B) multiple alloy forging preform 21 as shown in FIG. 3F. Multiple alloy forging preform 21 (e.g., billet) has a complementary stepped internal configuration of first alloy 30 overlaying a stepped second alloy 40. This configuration provides both axial (longitudinal) and radial separation of first alloy 32 and second alloy 42 within multiple alloy forging preform 21.

Referring to FIGS. 3F and 3G, multiple alloy forging preform 21 is then forged 220 in a suitable forging press to form forged multiple alloy rotor section 20, thereby causing deformation and plastic flow, resulting in a forged multiple alloy blank 390 as described herein.

Following forging 220, the forged multiple alloy blank 390 receives further finishing operations to form rotor section 20. As will be noted, this configuration provides a variable thickness covering of the first alloy 30 over a variable diameter core of the second alloy 40, where the thickness of the cover and core diameter vary inversely. The configuration illustrated also provides one end that is substantially all the second alloy and an opposing end that is substantially all the first alloy, although other configurations are possible. Forged multiple alloy blank 390 would next be heat treated 240 to develop the properties, such as solution heat treatment, partial solution heat treatment, aging heat treatment, and the like, as illustrated in FIG. 3H.

Referring to FIG. 3I, the forged multiple alloy blank 390 is machined 250 to form the forged multiple alloy rotor section 20 that has first alloy 30 and second alloy 40 having the features described herein. The forged multiple alloy rotor section 20 includes first alloy 30 and second alloy 40 that are axially separated along longitudinal axis 24, and also radially separated about longitudinal axis 24. Referring to FIGS. 1A and 1B, forged multiple alloy rotor section 20 may be used in accordance with method 100 to manufacture a multi-section, multiple alloy rotor as described herein. This configuration of first alloy 30 and second alloy 40 can be used to provide a multiple alloy rotor section 20 where the hub 26 (FIG. 1B) is substantially or entirely comprised of the second alloy 40, and protruding disks 27, 28, 29 have varying amounts and thicknesses of the first alloy 30 on the peripheral portions of the disks, where the thickness (t) varies axially along the length of rotor section 20. This configuration may be used, for example, to place a high temperature alloy in the HP section 90 and end of the rotor section 20 and to reduce the thickness of this alloy along the length of the rotor toward the LP section 94 and opposite end of rotor section 20.

Referring to FIGS. 4A-4J, in a second exemplary embodiment, the multiple alloy forging preform 21 may also be formed by a method 300 that includes forming 310 a multiple alloy powder preform 350. Multiple alloy powder preform 350 includes a first portion 352 comprising a first metal powder having the first alloy composition 32 and a second portion 356 comprising a second metal powder having the second alloy composition 42. Method 300 also includes consolidating 320 the powder preform 350 to sinter and densify the powder of the first alloy composition 32 and form the first alloy 30 and the powder of the second alloy composition 42 to form the second alloy 40, the first alloy 30 and second alloy 40 make up the multiple alloy forging preform 21.

Referring to FIG. 4A, a first tube 366 is inserted in the container 364 to provide separation and placement of the powder of the second alloy composition 42 within the first tube 366 and the powder of the first alloy composition 32 outside the tube 366, as well as a predetermined size and location of these powder portions. The container 364 is filled with both alloy powders and first tube 366 is withdrawn. First tube 366 may be centered on longitudinal axis 372 of container 364 so that powders are axisymmetrically located within container 364. Axisymmetric placement of first and second alloy powders is advantageous in that it maintains rotational balance of moments of inertia of first alloy and second alloy about axis 372 along the length of the resultant rotor section, once the powder is consolidated. Once container 364 is filled, a cover 376, such as a metal lid, is sealingly attached to container 364 and it is evacuated using any suitable evacuation means, such as through a sealing tube 378, and then sealed as shown in FIG. 4B thereby forming 310 multiple alloy powder preform 350. Referring to FIG. 4C, the evacuated container 364 and multiple alloy powder preform 350 are consolidated 320, to sinter and densify powder preform 350 to full or theoretical density by suitable application of heat and pressure over time, such as by pressing in a hot isostatic press (HIP) to form multiple alloy forging preform 21 (FIG. 4E). Multiple alloy forging preform 21 has a configuration that includes an annular ring of first alloy 30 overlaying a cylinder of second alloy 40. This configuration provides radial separation of first alloy 30 and second alloy 40 within multiple alloy forging preform 21. Referring to FIG. 4D, alternately, a multiple alloy forging preform 21 may be formed by extruding a powder of a first alloy composition 32 and a powder of a second alloy composition 42 in the direction shown by arrows 359 through an extrusion die 365 at a temperature sufficient to consolidate the powders and form an extrudate that may be severed to form multiple alloy forging preform 21.

Referring to FIGS. 4D-4F, multiple alloy forging preform 21 is then forged 220 in a suitable forging press, thereby causing deformation and plastic flow, resulting in a forged microstructure.

Following forging 220, the forged multiple alloy blank 390 receives further finishing operations to form rotor section 20, as described herein. As the first alloy 30 and second alloy 40 are compressed, the uniform cylinder of second alloy 40 and annular ring of first alloy 30 deformed outwardly forming an outwardly convex layer or shell of one alloy over an integral outwardly convex cylinder of the other alloy. As will be noted, this configuration provides a uniform thickness covering of the first alloy 30 over a variable diameter core of the second alloy 40, where the core diameter increases from roughly the same diameters on either end to a larger diameter in the central region of the core, while the covering maintains a uniform thickness over the periphery of the core. Forged multiple alloy blank 390 may optionally be heat treated 240 to develop the properties, such as solution heat treatment, partial solution heat treatment, aging heat treatment, the like, or a combination thereof, as described herein and illustrated in FIG. 4G. Referring to FIG. 4H, and alternately to FIGS. 4I and 4J, the forged multiple alloy blank 390 is machined 250 to form the forged multiple alloy rotor section 20 having the features described herein. The forged multiple alloy rotor section 20 includes first alloy 30 and second alloy 40 that are radially separated along longitudinal axis 24. Forged multiple alloy rotor section 20 may be used to manufacture a multi-section, multiple alloy rotor 10 as described herein. This configuration of first alloy and second alloy can be used to provide a multiple alloy rotor section 20 where the hub 26 (FIG. 1B) is substantially or entirely comprised of the second alloy 40, and one or more protruding disks have a uniform thicknesses of the first alloy 30 on the peripheral portions of the disks, where the thickness (t) varies axially along the length of rotor section 20. This configuration may be used, for example, to place a high temperature alloy in the HP section and high temperature end of the rotor section 20 and to reduce the thickness of this alloy along the length of the rotor toward the LP section and opposite (relatively lower temperature) end of rotor section 20. As illustrated in FIGS. 4I and 4J, machining 250 may also be used to remove material from the central portion of the section 20 at first end 36 and second end 46, such as the inwardly concave faces illustrated for the purposes described herein. Forged multiple alloy rotor section 20 may be use to manufacture a multi-section, multiple alloy rotor 10 as described herein.

Figures 5A, 5B:
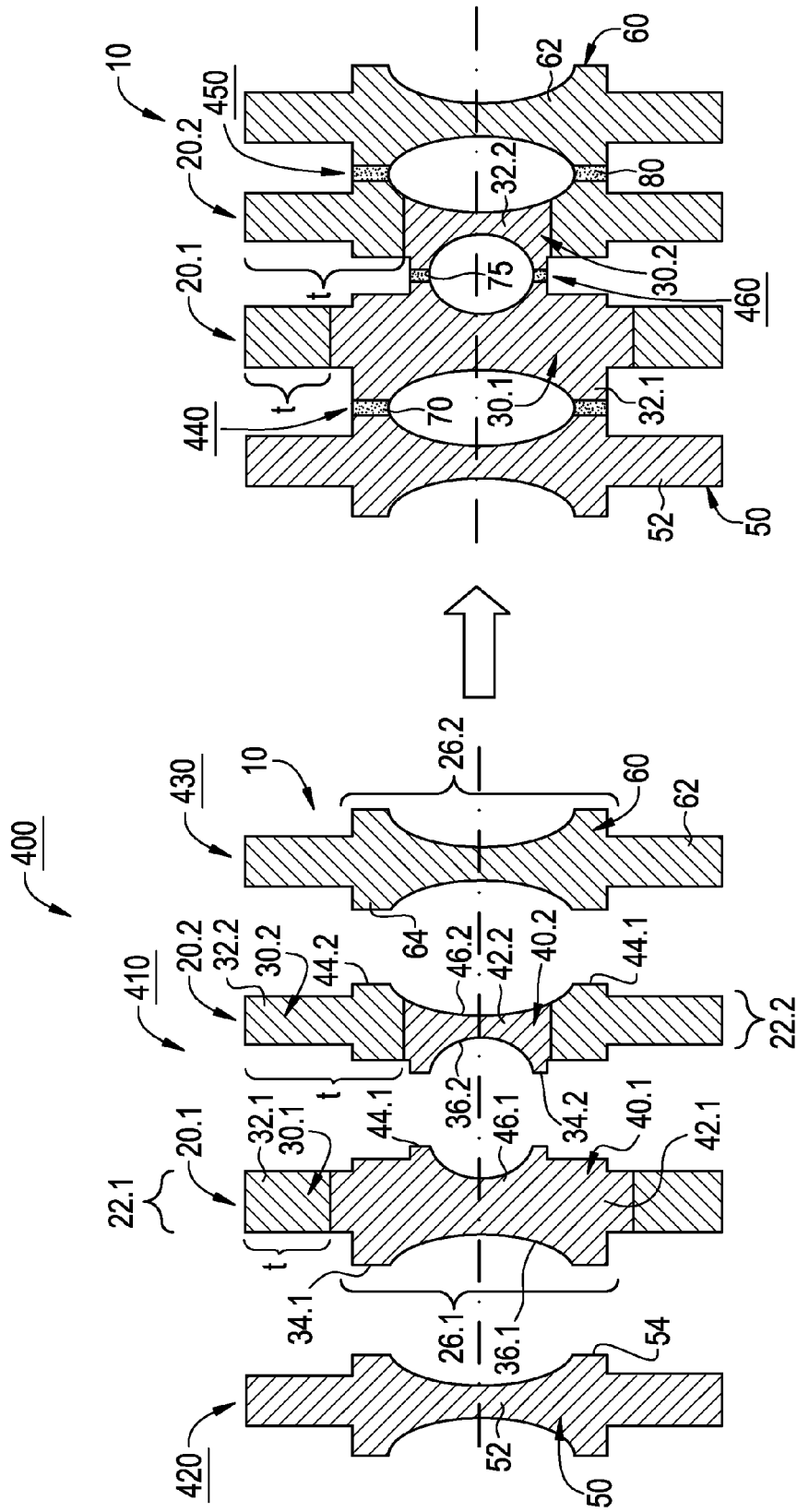
FIGS. 5A and 5B are schematic illustrations of a second exemplary embodiment of a method of making a multiple alloy, multi-section welded turbine rotor and welded rotor made thereby as disclosed herein.

Referring to FIGS. 5A and 5B, a second exemplary embodiment of a method 400 of making a multiple alloy, multi-section welded turbine rotor 10 is disclosed. The method 400 includes providing 410 a plurality of forged multiple alloy rotor sections 20.1 and 20.2, each having a monolithic structure 22.1 and 22.2. The multiple alloy rotor section 20.1 includes a first alloy 30.1 portion having a first alloy composition 32.1 and second alloy 40.1 portion having a second alloy composition 42.1. Second alloy 40.1 portion includes a first weld face 34.1 on a first end 36.1 of multiple alloy rotor section 20.1. Second alloy 40.1 includes a second weld face 44.1 on second end 46.1 that opposes first end 36.1. The first alloy composition 32.1 is different than the second alloy composition 42.1, and may include any suitable rotor alloys, including those described herein.

Multiple alloy rotor section 20.2 includes a first alloy 30.2 portion having a first alloy composition 32.2 and second alloy 40.2 portion having a second alloy composition 42.2. Second alloy 40.2 includes a first weld face 34.2 on a first end 36.2 of multiple alloy rotor section 20.2. First alloy 30.2 includes a second weld face 44.2 on second end 46.2 that opposes first end 36.2. The first alloy composition 32.2 is different than the second alloy composition 42.2, and may include any suitable alloys, including those described herein. The first alloy 30.1 and first alloy 30.2 may have the same alloy composition and microstructural morphology or different alloy compositions and microstructural morphologies, in any combination; however, second alloy composition 42.1 and second alloy composition 42.2 should be substantially the same in order to avoid creation of a dissimilar alloy weld joint between them. Referring to FIG. 5A, even though second alloy composition 42.1 and second alloy composition 42.2 should be substantially the same, the relative amounts of second alloy composition 42.1 and second alloy composition 42.2 in sections 20.1 and 20.2, respectively, may be different. For example, in forged multiple alloy rotor section 20.1, the entire hub 26.1 and a portion of the protruding disk are formed from second alloy composition 42.1, while in forged multiple alloy rotor section 20.2, only a portion of the hub 26.2 and none of the protruding disk are formed from second alloy composition 42.2. By combination of at least two multiple alloy rotor sections 20.1, 20.2, the thickness (t) of the first alloy 30.1 and 30.2 may be different (e.g., FIG. 5B). This configuration advantageously allows the thickness of first alloy 30.1 and first alloy 30.2 to be varied along the length of rotor 10. Further, this configuration would also advantageously permit first alloy composition 32.1 to even be different than that of first alloy composition 32.2 while maintaining the use of similar alloy welds.

Method 400 also includes providing 420 a first rotor section 50 having a first rotor section alloy composition 52 and a weld face 54 configured for disposition proximate first weld face 34.1. First rotor section alloy composition 52 is substantially the same as second alloy composition 42.1 proximate weld face 54. In the exemplary embodiment illustrated in FIGS. 5A and 5B, first rotor section alloy composition 52 is substantially the same as second alloy composition 42.1 proximate weld face 54, and in this embodiment, composition 52 is substantially the same throughout the first rotor section 50.

Method 400 also includes providing 430 a second rotor section 60 having a second rotor section alloy composition 62 and a weld face 64 configured for disposition proximate second weld face 44.2. Second rotor section alloy composition 62 is substantially the same as second alloy composition 42.2 proximate weld face 64. In the exemplary embodiment illustrated in FIGS. 5A and 5B, second rotor section alloy composition 62 should be substantially the same as second alloy composition 42.2 proximate weld face 64, and in this embodiment composition 62 is substantially the same throughout the second rotor section 60.

Method 400 also includes welding 440 the first rotor section 50 to the forged multiple alloy rotor section 20.1 to form similar alloy weld 70. first weld face 34. Welding 440 may include any suitable welding process or method for joining similar metal and alloys, and particularly those suitable for joining various superalloys, including Ni-base, Fe-base and Co-base superalloys, or combinations thereof, and those suitable for joining various grade of steel, including various grades of stainless steel.

Method 400 also includes welding 450 the second rotor section 60 to forged multiple alloy rotor section 20.2 to form similar alloy weld 80 along the second weld face 44.2. Welding 450 may also include any suitable welding process or method for joining similar metal and alloys, and particularly those suitable for joining various superalloys, including Ni-base or Fe-base superalloys, or a combination thereof, and those suitable for joining various grade of steel, including various grades of stainless steel. The steps of welding 440 and welding 450 may utilize the same welding method or different welding methods. In an exemplary embodiment, welding 440 and welding 450 may include the forms of fusion welding described herein.

Method 400 also includes welding 460 the first multiple alloy rotor section 20.1 to the second multiple rotor alloy section 20.2, by welding second weld face 44.1 to first weld face 34.2 to form similar alloy weld 75. Welding 460 may also include any suitable welding process or method for joining similar metal and alloys, and particularly those suitable for joining various superalloys, including Ni-base or Fe-base superalloys, or a combination thereof, and those suitable for joining various grade of steel, including various grades of stainless steel. The steps of welding 440, welding 450 and welding 460 may include the forms of fusion welding described herein.

The turbine rotor 10 configurations described herein use specially designed forged multiple alloy rotor sections 20, wherein the alloy chemistry and metallurgical characteristics at one end of the forging includes one alloy composition (e.g. CrMoV low alloy steel) while the other end of the forging includes a second alloy composition (e.g. a nickel-base superalloy) that is different from the first alloy composition. Such forged multiple alloy rotor sections 20 can be effectively joined by welding at each end with monolithic alloy rotor sections having similar, or even the same, alloy compositions yielding superior, low risk, similar alloy composition welds produced in accordance with established best welding practices.

Referring to FIGS. 6A-6F, in another exemplary embodiment, the multiple alloy forging preform 21 may also be formed by a method 500 that includes providing 510 a multiple alloy electrode 512 having an electrode axis 524. Multiple alloy electrode 512 has a first electrode portion 514 comprising first alloy 30 having first alloy composition 32 joined to an axially separated second electrode portion 516 comprising second alloy 40 having second alloy composition 42. Method 500 also includes melting 520 the multiple alloy electrode 512 to form the multiple alloy forging preform 21.

Referring to FIG. 6A, the multiple alloy electrode 512 may be provided 510 by joining a first electrode portion 514 of first alloy, such as a cylindrical bar or rod of first alloy 30 having first alloy composition 32 and a second electrode portion 516, such as a cylindrical bar or rod of second alloy 40 having second alloy composition 42. The joining of first alloy 30 and second alloy 40 may include any suitable joining method, such as, for example, friction welding or various forms of arc welding. Alternately, the multiple alloy electrode 512 may be provided 510 by forming a powder preform as described herein comprising a first electrode powder portion having the first alloy composition 32 and a second electrode powder portion having the second alloy composition 42; and consolidating the powder preform to sinter and densify the first powder portion of the first alloy composition 32 to form first alloy 30 and the second powder portion of the second alloy composition 42 to form second alloy 40, the alloys together forming the multiple alloy electrode 512. In the embodiments illustrated by FIG. 6A, there is a sharply delineated interface 518, such as a planar interface, between first electrode portion 514 and second electrode portion 516 as illustrated in FIG. 5A. The method of forming a multiple alloy powder preform and consolidating the powder preform to form a multiple alloy forging preform described above with reference to FIGS. 3A-3F can also be used to form the multiple alloy electrode except that the powder preform has two distinct axially separated portions rather than the stepped configuration of FIGS. 3A-3F. In another exemplary embodiment (not shown), rather than interface 518, a powder preform may also include a transition powder portion located between the first electrode powder portion and second electrode powder portion that includes a predetermined alloy composition. In one exemplary embodiment the predetermined alloy composition may include a composition obtainable as a mixture of the first electrode powder having first alloy composition 32 and the second electrode powder having the second alloy composition 42, and may range from 0-100% by weight of one of the first or second alloy composition, with the balance of the other alloy composition being the difference required to achieve 100%. The transition powder portion may have any predetermined alloy composition and may have any suitable thickness, and the first interface with the first powder portion and second interface with the second powder portion may have any suitable shape, including orthogonal flat planar shapes, and all manner of curved shapes, with interface shapes that are axisymmetric about the axis being preferred for the reasons described herein. Upon consolidation, the transition powder portion is consolidated to form transition alloy having a predetermined alloy composition. Suitable alloy compositions for first alloy composition 32 and second alloy composition 42 are those described above. Predetermined transition alloy compositions suitable for transition alloy include compositions having constituents amounts that are intermediate those described for first alloy composition 32 and second alloy composition 42.

Referring to FIG. 6B, method 500 also includes melting 520 the multiple alloy electrode 512 to form the multiple alloy forging preform 21. Melting 520 may be performed using any suitable method. Suitable methods will generally retain the distinctiveness of first alloy composition 32 and second alloy composition 42.

Suitable methods for melting 520 include using a casting technique, preferably a consumable electrode remelting technique such as electro-slag remelting (ESR) or vacuum arc remelting (VAR) and similar melting methods. As with conventional ESR or VAR techniques, FIG. 6B shows an electrode 512 suspended over a melt pool 528 contained in a chilled crucible 532. During melting, molten droplets of the electrode 512 solidify to produce a forging preform 21 having discrete regions corresponding to first alloy 30, an intermediate alloy 536 and second alloy 40 along its axial length. Alternately, a separate piece of each alloy could be melted individually and in sequence to form the forging perform 21. As the process is illustrated in FIG. 6B, the order of first alloy 30 and second alloy 40 could be reversed from that shown. The first alloy 30, intermediate alloy 536 and second alloy 40 have lengths appropriate to create the corresponding HP, intermediate and LP regions of forging preform 21. The intermediate alloy 536 of the forging perform 21 is a transition zone 538 between the first alloy 30 and second alloy 40. Regardless of whether the multiple alloy electrode 512 includes the transition alloy described above, the intermediate alloy 536 inherently forms as a result of intermixing of the first alloy 30 and second alloy 40 during the melting process. If the multiple alloy electrode 512 is formed to include the transition alloy, the intermediate alloy 536 can be formulated to have a controlled intermediate alloy composition 540 or range of compositions to control the chemistry gradient (i.e., to an alloy composition different from that which would result from the melting and intermixing of first alloy 30 and second alloy 40 only) and/or the width of the transition zone 538 within the ingot 534 and forging preform 21. The transition zone 538 may have a shape whose axial boundaries, though corresponding to the shape of the melt pool 528, can be asymmetrical to some degree about the axis 524 of the forging preform 21.

Referring to FIG. 6D, upon forging 220, first alloy 30, intermediate alloy 536 and second alloy 40 define corresponding portions of forged multiple alloy rotor section 20 (FIG. 6E), and may be heat treated as illustrated in FIG. 6E. Referring to FIG. 6F, the multiple alloy rotor section 20 may be forged to a net or final shape or a near-net or nearly final shape (e.g., FIG. 6F) or machined to the desired shape, as described herein.

Referring to FIG. 7, forged multiple alloy rotor section 20 may be used to make welded multiple alloy, multi-section rotor 10 in accordance with method 100 described herein. Accordingly, forged multiple alloy rotor section 20 and the welded rotor 10 made therewith will incorporate an intermediate alloy 536 and a transition zone 538 and intermediate alloy composition 540 with its own forged microstructure rather than a sharp demarcation or delineation between the microstructure of first alloy 30 and second alloy 40.

Various characteristics are required for the different HP, IP and LP sections of the forged multiple alloy rotor section 20 in order to achieve the desired properties for section 20, such as tensile strength, fracture toughness, rupture strength, creep fatigue, thermal stability, and high process capability (repeatability and reproducibility), as well as cost targets. Referring to, for example, FIG. 1E, in order to achieve the mechanical properties desired for the rotor, the chemistries of the multiple alloys of the forged rotor section 20 are likely to be sufficiently different to require different heat treatment temperatures and durations, such that a differential heat treatment may be desirable prior to machining. For this purpose, a furnace with multiple temperature zones (not shown) may be used to provide an appropriate heat treatment temperature for each region 90, 92 and 94 of the rotor section forging 20. The heat treatment may include a differential temperature for both the solution or austenitizing treatment and the aging or tempering treatment of the particular alloys. Differential cooling from the solution or austenitizing temperature is also preferably used. Rapid cooling can be used to achieve full section hardening, to avoid harmful precipitation reactions, and/or to enhance toughness. Slow cooling can be used to reduce thermal stresses and reduce the risk of quench cracking. Particular temperatures, durations, and heating and cooling rates suitable for the rotor section forging 20 will depend on the materials used, and such heat treatment parameters will generally be within the capability of one skilled in the art.

The ability to produce a monolithic multiple alloy rotor section 20 and provide a multiple alloy welded rotor 10 as described above eliminates the drawbacks associated with dissimilar alloy welding that would otherwise be required to join separate sections of the first alloy and second alloy.

Referring to FIGS. 8A-8D, in another exemplary embodiment, the multiple alloy forging preform 21 may also be formed by a method 700 that includes spray forming 710 (FIG. 8A) a layer 712 of a first alloy 30 having first alloy composition 32 over a preform 714 of a second alloy 40 having second alloy composition 42. Spray forming 710 may be performed by employing a movable spray nozzle 715 or alternately a fixed nozzle and moveable table or bed (not shown) on which preform 714 is located to apply a spray 713 of molten first alloy 30. Alternately, a plurality of layers 712, 712.1, 712.2 ... 712.n may be employed, and they may have the same alloy composition, or a plurality of different (e.g., 32, 32.1, 32.2 ... 32.n) alloy compositions, thereby adapted to form a plurality of different alloys (e.g., 30, 30.1, 30.2 ... 30.n). Furthermore, the roles of first alloy 30 and second alloy 40 can be reversed (not shown), so that method 700 includes spray forming a layer of second alloy 40 having second alloy composition 42 over a preform that includes first alloy 30 having first alloy composition 32. Layer 712 may, for example, include a layer applied to a portion of preform 714 that will become a welding face. As the layer 712 may have less than full or theoretical density, method 700 may also include consolidating 720 (FIG. 8B) the layer 712. Consolidating may include any suitable method of consolidating a sprayed alloy layer, such as using a HIP to consolidate the spray formed layer, to form forging preform 21. Forging preform 21 may be subject to forging 220 (FIG. 8C)(or rolling) to form the forged multiple alloy rotor section 20 (FIG. 8D). Forged multiple alloy rotor section 20 may also be heat treated to develop metallurgical, mechanical or chemical properties, in any combination, as described herein.

Referring to FIGS. 9A-9D, in another exemplary embodiment, the multiple alloy forging preform 21 may also be formed by a method 900 that includes applying 910 (FIG. 9A), such as by spraying through a movable spray nozzle 915, a layer 912, or a plurality of layers, of a powder 913 of a first alloy 30 having first alloy composition 32 over a preform 914 of a second alloy 40 having second alloy composition 42. The layer 912 of powder 913 may be consolidated by melting using a movable laser 917. Alternatively, the preform 914 may be moveable and one or both of the spray nozzle and laser 917 may be fixed. Alternately, a plurality of layers 912, 912.1, 912.2 ... 912.N may be employed, and they may have the same alloy composition, or a plurality of different (e.g., 32, 32.1, 32.2 ... 32.N) alloy compositions, thereby adapted to form a plurality of different alloys (e.g., 30, 30.1, 30.2 ... 30.N. Further and alternately, the roles of first alloy 30 and second alloy 40 can be reversed (not shown), so that method 900 includes spray forming a layer of second alloy 40 having second alloy composition 42 over a preform that includes first alloy 30 having first alloy composition 32. Layer 912 may, for example, include a layer applied to a portion of preform 914 that will become a welding face. As the layer 912 may have less than full or theoretical density, method 900 may also include consolidating 920 (FIG. 9B) the layer 912. Consolidating 920 may include any suitable method of consolidating a fused powder particle alloy layer 912, such as using a HIP to consolidate the spray formed layer to form forging preform 21. Forging preform 21 may be subject to forging 220 (FIG. 9C) (or rolling) of forging preform 21 to form the forged multiple alloy rotor section 20 (FIG. 9D). Forged multiple alloy rotor section 20 may also be heat treated to develop metallurgical, mechanical or chemical properties, in any combination, as described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of making a multiple alloy, multi-section welded turbine rotor, comprising:
providing a forged multiple alloy rotor section having a monolithic structure, the rotor section comprising a first alloy having a first alloy composition and second alloy having a second alloy composition, a first weld face comprising the first alloy on a first end and a second weld face comprising the second alloy on an opposed second end;
providing a first rotor section comprising the first alloy composition and a second rotor section comprising the second alloy composition;
welding the first rotor section to the first weld face; and
welding the second rotor section to the second weld face.

2. The method of claim 1, wherein one of welding the first rotor section or welding the second rotor section comprises fusion welding.

3. The method of claim 1, further comprising machining the forged multiple alloy rotor section prior to welding the first rotor section or second rotor section.

4. The method of claim 1, further comprising heat treating the forged multiple alloy rotor section prior to welding the first rotor section or second rotor section.

5. The method of claim 1, wherein one of the first alloy or the second alloy comprises a Ni-base, Co-base or Fe-base superalloy, or a combination thereof, and the other of the first alloy or the second alloy comprises a steel.

6. The method of claim 1, wherein the forged multiple alloy rotor section is provided by a method comprising:
forming a multiple alloy forging preform; and
forging the multiple alloy forging preform to form the forged multiple alloy rotor section having a monolithic structure.

7. The method of claim 6, wherein the multiple alloy forging preform is formed by a method of:
forming a multiple alloy powder preform comprising a first portion comprising a powder having the first alloy composition and a second portion comprising a powder having the second alloy composition; and
consolidating the powder preform to sinter and densify the powder of the first alloy composition and form the first alloy and the powder of the second alloy composition to form the second alloy, the first alloy and second alloy comprising the multiple alloy forging preform.

8. The method of claim 7, wherein one of the first alloy or the second alloy is located radially inwardly of the other.

9. The method of claim 7, wherein the multiple alloy rotor section has a longitudinal axis and the first alloy and the second alloy are axially separated.

10. The method of claim 6, wherein the multiple alloy forging preform is formed by a method of:
providing a multiple alloy electrode having an electrode axis, a first electrode portion comprising the first alloy composition joined to an axially separated second electrode portion comprising the second alloy composition; and
melting the multiple alloy electrode to form the multiple alloy forging preform.

11. The method of claim 10, wherein the multiple alloy electrode is provided by joining a first alloy preform having the first alloy composition and a second alloy preform having the second alloy composition.

12. The method of claim 11, wherein joining comprises friction welding or arc welding.

13. The method of claim 10, wherein the multiple alloy electrode is provided by forming a powder preform comprising a first electrode powder portion having the first alloy composition and a second electrode powder portion having the second alloy composition; and
consolidating the powder preform to sinter and densify the powder of the first alloy composition and the powder of the second alloy composition to form the multiple alloy electrode.

14. The method of claim 13, further comprising a transition powder portion located between the first electrode powder portion and second electrode powder portion comprising a predetermined mixture of the first electrode powder and the second electrode powder.

15. The method of claim 6, wherein the multiple alloy forging preform is formed by a method of:
forming a preform of a first alloy; and
depositing the second alloy on the preform to form the multiple alloy forging preform.

16. The method of claim 15, wherein depositing the second alloy comprises spray forming the second alloy.

17. The method of claim 15, wherein depositing the second alloy comprises:
depositing a powder having the second alloy composition onto the preform; and
consolidating the powder to form the second alloy and the multiple alloy forging preform.

18. A multiple alloy, multi-section welded turbine rotor, comprising:
a multiple alloy rotor section having a monolithic microstructure and a longitudinal axis, the rotor section comprising a first alloy having a first alloy composition and second alloy having a second alloy composition, a first weld face comprising the first alloy on a first end and a second weld face comprising the second alloy on an opposed second end, the monolithic structure having a forged microstructure;
a first rotor section comprising the first alloy composition, the first rotor section joined to the first weld face by a first weld joint; and
a second rotor section comprising the second alloy composition, the second rotor section joined to the second weld face by a second weld joint.

19. The turbine rotor of claim 18, wherein one of the first alloy or the second alloy is located radially inwardly of the other about the longitudinal axis, or axially separated along the longitudinal axis, or a combination thereof.

20. A multiple alloy rotor section having a monolithic structure, the rotor section comprising a first alloy portion having a first alloy composition and second alloy portion having a second alloy composition, a first weld face comprising the first alloy on a first end and a second weld face comprising the second alloy portion on an opposed second end, the monolithic structure having a forged microstructure.

\* \* \* \* \*

UNITED STATES PATENT AND TRADEMARK OFFICE
CERTIFICATE OF CORRECTION

PATENT NO. : 8,414,267 B2
APPLICATION NO. : 12/570566
DATED : April 9, 2013
INVENTOR(S) : Ganesh et al.

It is certified that error appears in the above-identified patent and that said Letters Patent is hereby corrected as shown below:

On the Title Page, in Item (57), under "ABSTRACT", in Column 2, Line 6, delete "an a second" and insert -- a second --, therefor.

In the Drawings

In Fig. 2A, Sheet 2 of 11, for Tag "160", in Line 1, delete "Mutiple" and insert -- Multiple --, therefor, as shown on the attached drawing sheet 2 of 11 consisting of Fig. 2A.

In Fig. 2A, Sheet 2 of 11, for Tag "170", in Line 1, delete "Mutiple" and insert -- Multiple --, therefor, as shown on the attached drawing sheet 2 of 11 consisting of Fig. 2A.

In the Specification

In Column 2, Lines 5-6, delete "liquidation" and insert -- liquation --, therefor.

In Column 16, Line 62, delete "30.N." and insert -- 30.N). --, therefor.

In the Claims

In Column 18, Lines 54-55, in Claim 18, delete "microstructure" and insert -- structure --, therefor.

Signed and Sealed this
Thirteenth Day of August, 2013

Teresa Stanek Rea
*Acting Director of the United States Patent and Trademark Office*